Patented July 27, 1954

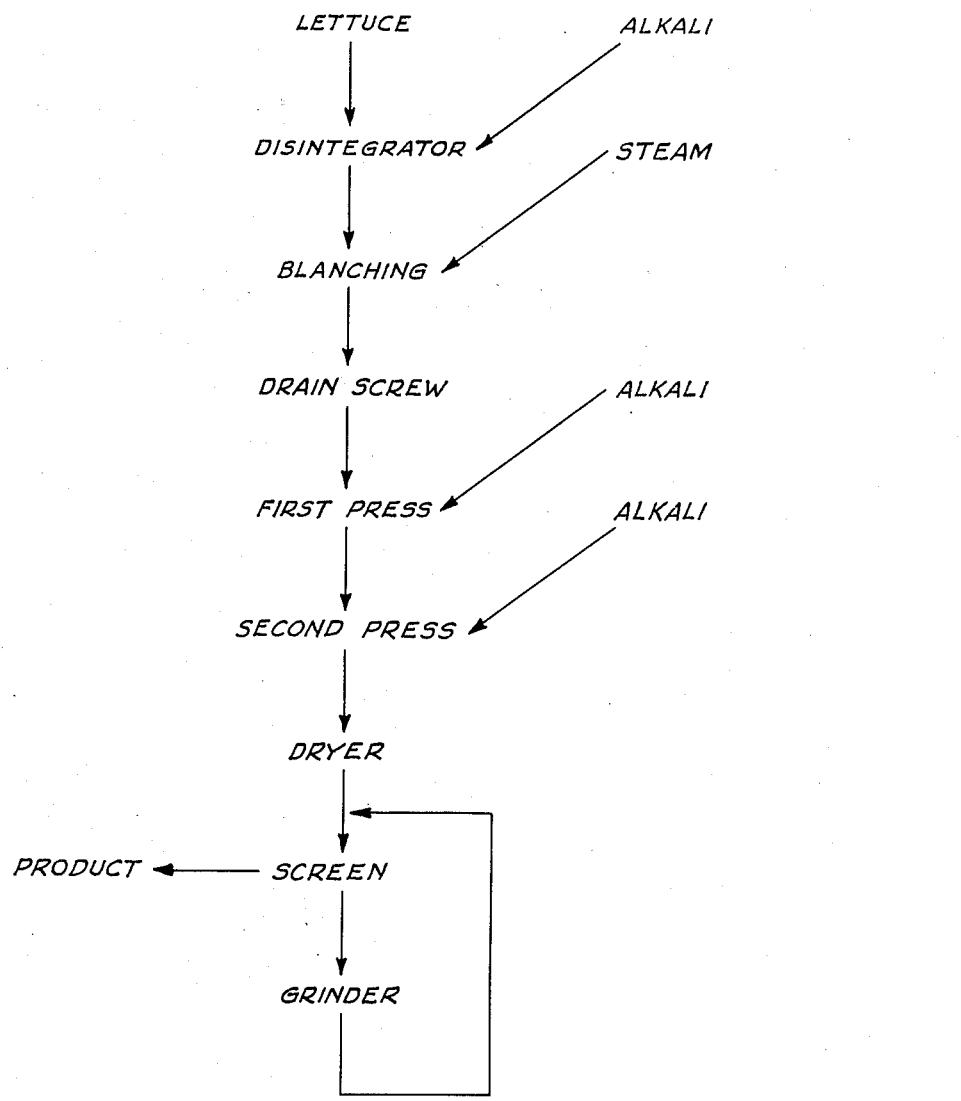

2,684,903

UNITED STATES PATENT OFFICE 2,684,903

PROCESS FOR EVALUATING LETTUCE

James G. Macey, Kentfield, Calif., assignor, by mesne assignments, to Salinas Laboratories, Inc., Salinas, Calif., a corporation of California Application January 23, 1951, Serial No. 207,367

13 Claims. (Cl. 99—2)

This invention relates to the production of a valuable animal feed material from lettuce.

Preparation of lettuce for shipment to Midwest and Eastern markets from the areas in which it is grown in the Western part of the United States results in a waste of approximately 40% of the lettuce taken from the fields. Heretofore, the only practical use which has been made of such lettuce has been as a direct animal feed. I have found that lettuce can be dehydrated to provide a valuable feed material or feed additive with preservation of the carotene, protein, B-vitamins, fat, carbohydrates and mineral content. The present invention contemplates provision of a process enabling lettuce to be dehydrated readily to a relatively dry form to produce a product which is considered to be of greater value as a feed than alfalfa. For example, the dry lettuce meal produced in accordance with this invention lacks the toxicity or growth inhibiting factors present in alfalfa and which limit the amount of dry alfalfa which can be incorporated in certain mixed feed for chicks to 5% by weight. A further advantage is found in the fact that lettuce has a lower fiber content than alfalfa, lettuce having only approximately 14% fiber, while alfalfa has 25%.

It is in general the broad object of the present invention to provide a novel process for the drying of lettuce to provide a stable meal useful as a feed material.

The invention includes other objects and features of advantage, some of which, together with the foregoing, will appear hereinafter wherein the present preferred form of process of this invention is disclosed.

Briefly stated, the present invention contemplates the disintegration of lettuce, including whole heads, butts and outer leaves, into finely divided form, following which the lettuce meal is blanched to embrittle and fracture the cell walls and release the contents of the cells; the term "lettuce pulp" is applied hereinafter to the comminuted lettuce. Following blanching, the product is subjected to a pressing operation to remove the liquid. Preferably, the pressing operation is carried on in several stages. Finally, the solid material is subjected to drying in a suitable dryer.

Disintegration of lettuce followed by pressing in one or more presses to separate solids from a liquid fraction, followed by drying of the solids, has been proposed heretofore in the Smith Patent 2,190,176 of February 13, 1940. This process, however, does not result in as good a product as that obtained in accordance with this invention, nor one which can be practiced with such economy as to be commercially feasible. For example, it is essential to blanch as soon as possible following disintegration to prevent enzymatic oxidation of the carotene and chlorophyll and enzymatic solubilization of the protein present. In addition, I have found that it is necessary to effect a certain localized adjustment of the pH of the lettuce pulp before blanching, else the chlorophyll value, as indicated by the green color, will be lost. Further, and this is also of importance, unless the pH is suitably locally adjusted, the blanched pulp is of a slippery gelatinous texture from which it is practically impossible to remove an adequate amount of water by pressing and which will expend considerable power wastefully unless the pH is adjusted.

I have found that by adding a suitable alkali, one can inhibit the dissipation of chlorophyll. This addition of alkali is made preferably during disintegration to effect a complete and thorough mixing, but one can also add the alkali later but before or during blanching. When the alkalinity or pH is properly adjusted, the pulp which issues from the blanching is a bright green color and of a firm nature from which a very substantial quantity of water can be readily separated upon pressing.

As an alkali, one can use sodium hydroxide, sodium carbonate or bicarbonate, or the corresponding potassium compounds. One can use any alkali compatible with the end use of the lettuce solids, but ammonia and lime are preferred because they are readily handled and are inexpensive. The amount of alkali employed need not be such as to alter the pH of the entire mass, it only being desired to alter the pH about the individual solid lettuce fragments or particles making up the solid portion of the pulp. The usual pH of the pulp is about 5 and I have found that by adding a small quantity of ammonia, lime or other alkali until the local pH about each particle is of the order of about 7 to about 8, enzymatic action is diminished, the green color is maintained and the blanched pulp can be readily pressed to remove water.

It is to be pointed out that the total alkali added is much less than that required to alter and to maintain the pH of the mass at a selected value. In fact, the quantity is such that the pH is only changed externally and about the surface of the particles and that with the passage of time the original acidity of the mass will return or nearly so. By adjusting the pH locally and about the particles in the pulp, it is possible to separate the aqueous phase from the solid phase and to recover the latter completely.

As specific quantities of alkali, for example, I have successfully used from ½ to 1 pound of ammonia per ton of raw lettuce pulp, the average being about 0.75 pound per ton, preferably 1 to 1½ pounds of lime per ton is also added, but this quantity can be increased to 2 pounds per ton if desired; the average is about a pound per ton. The alkali added is apparently only sufficient to alter the pH of those pectins and the like which are exposed in a semi-liquid or gelatinous phase. One can use any alkali metal compound or alkaline earth compound or alkaline organic compound which is not too expensive and which is not incompatible with the end use of the dry lettuce meal. Ammonia and calcium compounds are particularly suited to use as feeds; potassium compounds can also be used, but may be considered by some as too expensive for a feed element. Further, the slow solubility of the lime is offset by the higher solubility of the ammonia so the two combine to maintain the desired pH during the process.

It is essential to effect the entire operation with a relatively rapid sequence of steps, else the local pH will revert, the enzymatic oxidation of the carotene and chlorophyll and solubilization of protein will occur, while the mass will be slimy and difficult to press.

The pressing operation should be carried on under such conditions that a slow, gentle kneading action is applied rather than a fast or powerful application. The pressing should continue over a period of about 25 minutes while the whole process should be completed in a matter of about 45 minutes.

Blanching of the lettuce is preferably effected with steam under 2 to 3 pounds pressure; the lettuce issuing from the blanching operation should not exceed a temperature of from 190° to 210° F. One can utilize a lower temperature of the order of 170° F., but a much longer time at this temperature is required to prevent the enzymatic action.

Following the pressing operation wherein the moisture is reduced to within the range of 60% to 70%, preferably 65%, the material is preferably shredded and is then dried at such a temperature that undesirable heat alteration of constituents of the lettuce does not occur. Shredding is not essential, but it assists drying. In this connection, one can successfully use any type of dryer, but I prefer to employ the so-called 2 or 3 pass alfalfa dryer which is well-known in the alfalfa drying art. One which can be utilized successfully is manufactured by the Heil Company of Milwaukee, Wisconsin, and comprises three concentrically arranged tubes providing a relatively long traverse, as is shown in Heil Bulletin No. ARD 600, of August, 1947. The lettuce pulp feed is injected directly into a high velocity air plus products of combustion gas stream at a temperature of 1100°–1200° F. The dry feed issuing from the dryer is at a temperature of less than 200° F.

The drawing is a representation of the flow sheet employed.

As illustrative of the present invention, the following is set forth: 22 tons of mixed lettuce waste containing full heads and outer leaves were disintegrated to pass a screen having holes 1" in diameter in a Rietz disintegrator. At the same time, one-half pound of ammonia per ton of lettuce was fed in as aqueous ammonia (NH₃), as the lettuce passed to the disintegrator, together with 1½ pounds per ton of calcium hydroxide as a dry powder. The mixture issuing from the disintegrator was subjected to blanching in a continuous blanching screw with steam supplied at 3 pounds pressure. The material issuing from the blanching screw was at a temperature of 200° F.; it was retained in the blancher for eight minutes. The material was then passed to a drying screw where water was removed, following which the material was passed into a screw press wherein the water content was further reduced.

The remaining material was then passed into a frictionless type of press of the type known as a "wheel press" wherein the water content was further reduced; at this point the weight had been reduced to 3 tons of which one ton was solids. A suitable press is the Davenport Continuous Press, made by Davenport Machine & Foundry Co. The material was then shredded and fed into an alfalfa type dryer approximately 20' long and 8' in diameter, in which the entering products of combustion were supplied at 1100° F. The material was dried to a moisture content of 9% in the dryer and the issuing material had the various characteristics set forth in the following table:

|  | Lettuce | Alfalfa |
|---|---|---|
| Protein...........................percent.. | 21 | 18 |
| Fat.................................do.... | 5¼ | 2 |
| Digestible Nutrients.................do.... | 68 | 55 |
| Carotene I. U. per pound................ | 200,000 | 140,000 |

The pressing and water elimination steps can be further improved by adding a small amount of alkali, 1/10 pound of ammonia as aqueous ammonia, for example, before and after the first pressing operation to preserve the free-flowing and easy pressing character of the material as well as to guard against further loss of values by oxidation.

I claim:

1. A process for treating lettuce comprising comminuting fresh lettuce to produce a finely divided lettuce pulp, adding an alkaline substance to the pulp to establish a local pH about the particles comprising the pulp of about 7 to about 8, then blanching the pulp while maintaining said pH to raise the temperature thereof for a time sufficient to prevent deleterious enzymatic action on the lettuce, then pressing the lettuce pulp to separate the solids from liquid, and drying the pressed solids to a dry meal.

2. A process for treating lettuce comprising comminuting fresh lettuce to produce a finely divided lettuce pulp, adding ammonia to the pulp at the rate of about 0.75 pound per ton of lettuce to establish a local pH about the particles comprising the pulp of about 7 to about 8, then blanching the pulp while maintaining said pH to raise the temperature thereof for a time sufficient to prevent deleterious enzymatic action on the lettuce, then pressing the lettuce pulp to separate the solids from liquid, and drying the pressed solids to a dry meal.

3. A process for treating lettuce comprising comminuting fresh lettuce to produce a finely divided lettuce pulp, adding ammonia to the pulp at the rate of about 0.75 pound per ton of lettuce and lime at the rate of about a pound per ton of lettuce to establish a local pH about the particles comprising the pulp of about 7 to about 8, then blanching the pulp to raise the temperature thereof for a time sufficient to prevent deleterious enzymatic action on the lettuce, then pressing the lettuce pulp to separate the solids from liquid, and drying the pressed solids to a dry meal.

4. A process for treating lettuce comprising comminuting fresh lettuce to produce a finely divided lettuce pulp, adding ammonia to the pulp at the rate of about 0.75 pound per ton of lettuce and lime at the rate of about a pound per ton of lettuce to establish a local pH about the particles comprising the pulp of about 7 to about 8, then blanching the pulp to raise the temperature thereof to about 170° F. to 210° F. for a time sufficient to prevent deleterious enzymatic action on the lettuce, then pressing the lettuce pulp to separate the solids from liquid, and drying the pressed solids to a dry meal.

5. A process as in claim 1 wherein about a tenth of a pound of ammonia is added to each ton of the pulp following blanching and before pressing the pulp.

6. A process as in claim 2 wherein about a tenth of a pound of ammonia is added to each ton of the pulp following blanching and before pressing the pulp.

7. A process as in claim 3 wherein about a tenth of a pound of ammonia is added to each ton of the pulp following blanching and before pressing the pulp.

8. A process as in claim 4 wherein about a tenth of a pound of ammonia is added to each ton of the pulp following blanching and before pressing the pulp.

9. A process as in claim 1 wherein a small amount of alkali is added to each ton of the pulp following blanching and before pressing the pulp.

10. A process as in claim 2 wherein a small amount of alkali is added to each ton of the pulp following blanching and before pressing the pulp.

11. A process as in claim 3 wherein a small amount of alkali is added to each ton of the pulp following blanching and before pressing the pulp.

12. A process as in claim 4 wherein a small amount of alkali is added to each ton of the pulp following blanching and before pressing the pulp.

13. A process as in claim 1 wherein a small amount of alkali is added to the pulp following blanching to adjust the local pH about each particle comprising the pulp, said alkali addition being made prior to pressing of the pulp.

References Cited in the file of this patent

UNITED STATES PATENTS

| Number | Name | Date |
| --- | --- | --- |
| 2,187,501 | Lissaner | Jan. 16, 1940 |
| 2,190,176 | Smith | Feb. 13, 1940 |
| 2,455,782 | Kuder | Dec. 7, 1948 |
| 2,548,510 | Neal | Apr. 10, 1951 |
| 2,552,343 | Peebles et al. | May 8, 1951 |
| 2,559,459 | Peebles et al. | July 3, 1951 |